US009120439B2

(12) United States Patent  (10) Patent No.: US 9,120,439 B2
Poisson-Choisne et al.  (45) Date of Patent: Sep. 1, 2015

(54) METHOD AND SYSTEM FOR CONTROLLING THE MANAGEMENT OF THE ELECTRIC POWER SUPPLY OF A VEHICLE AFTER THE POWER UNIT HAS STOPPED

(75) Inventors: Carine Poisson-Choisne, Montlhery (FR); Gregory Bertrand, Asnieres (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/126,671

(22) PCT Filed: May 25, 2012

(86) PCT No.: PCT/FR2012/051189
§ 371 (c)(1),
(2), (4) Date: Feb. 20, 2014

(87) PCT Pub. No.: WO2012/172230
PCT Pub. Date: Dec. 20, 2012

(65) Prior Publication Data
US 2014/0163819 A1  Jun. 12, 2014

(30) Foreign Application Priority Data
Jun. 15, 2011 (FR) .................... 11 55220

(51) Int. Cl.
*B60R 16/03* (2006.01)
(52) U.S. Cl.
CPC ............. *B60R 16/03* (2013.01); *B60R 16/0315* (2013.01)
(58) Field of Classification Search
None
See application file for complete search history.

(56) References Cited

U.S. PATENT DOCUMENTS

| 5,121,386 A | 6/1992 | Wolfsgruber et al. |
| 5,481,456 A | 1/1996 | Ogura |
| 2002/0091475 A1 | 7/2002 | Hashimoto et al. |
| 2004/0019414 A1 | 1/2004 | Pillar et al. |

(Continued)

FOREIGN PATENT DOCUMENTS

| EP | 0 396 090 | 11/1990 |
| WO | 2007 083085 | 7/2007 |
| WO | 2008 136738 | 11/2008 |

OTHER PUBLICATIONS

International Search Report Issued Jul. 30, 2012 in PCT/FR12/051189 Filed May 25, 2012.

(Continued)

*Primary Examiner* — Fadey Jabr
*Assistant Examiner* — Krishnan Ramesh
(74) *Attorney, Agent, or Firm* — Oblon, McClelland, Maier & Neustadt, L.L.P.

(57) ABSTRACT

A method for controlling electric power supply of a motor vehicle including a power unit and an electric power supply battery, the vehicle including at least one autonomous computer, at least one master computer, and at least one slave computer, the computers connected by a data network, the autonomous computers each configured to carry out at least one task after the power unit has stopped, and the power supply to the computers being maintained for a first period of time. The control method includes: reporting absence of the autonomous computer to the master computer; interrupting the power supply of each slave computer; interrupting the power supply of the master computer; maintaining the power supply of the autonomous computer beyond the first period of time; interrupting the power supply of each autonomous computer once it has finished its task.

12 Claims, 2 Drawing Sheets

(56) References Cited

U.S. PATENT DOCUMENTS

Figure 1:
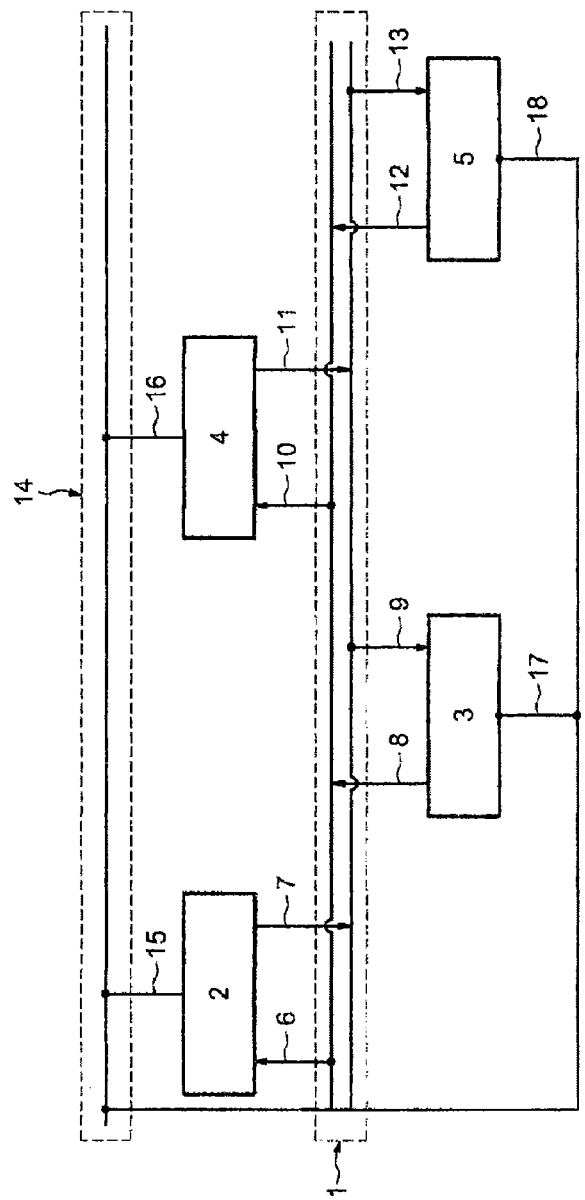

| | | | |
|---|---|---|---|
| 2005/0160301 A1* | 7/2005 | Disser | 713/310 |
| 2005/0213272 A1* | 9/2005 | Kobayashi | 361/62 |
| 2006/0085654 A1* | 4/2006 | Nokkonen | 713/300 |
| 2008/0086247 A1* | 4/2008 | Gu et al. | 701/36 |
| 2009/0146610 A1* | 6/2009 | Trigiani | 320/119 |
| 2010/0082198 A1 | 4/2010 | Arai et al. | |
| 2010/0109430 A1 | 5/2010 | Disaverio et al. | |
| 2010/0222955 A1* | 9/2010 | Chevalier | 701/29 |
| 2012/0072629 A1* | 3/2012 | Tokuda | 710/110 |
| 2014/0094998 A1* | 4/2014 | Cooper et al. | 701/2 |

OTHER PUBLICATIONS

French Search Report issued Apr. 24, 2012 in FR 1155220 Filed Jun. 15, 2011.

* cited by examiner

METHOD AND SYSTEM FOR CONTROLLING THE MANAGEMENT OF THE ELECTRIC POWER SUPPLY OF A VEHICLE AFTER THE POWER UNIT HAS STOPPED

The technical field of the invention is the management of the electrical power supply of a vehicle, and more particularly, management of the electrical power supply of a vehicle after the engine has been turned off.

In most vehicles, turning the engine off and removing the ignition key signals the start of a phase of maintaining the supply of power to the engine management processor. This processor manages the shutdown phase of the vehicle during which checks and diagnostics are carried out prior to complete shutdown of the vehicle. For example, if the temperature of the cooling circuit of the engine is above a threshold, fans are kept turned on in order to allow the powertrain to be cooled. Operation of these fans then depends on the temperature of the cooling circuit, which is monitored by the engine management processor. The latter must therefore continue to be supplied with power in order to carry out this measurement.

The phase of maintaining the supply of power to the network is accompanied by power consumption sourced from the battery, without it being possible to recharge the latter by virtue of the alternator since the engine has stopped. After a certain amount of time, the processors are turned off. The master processor must wait for all the slave processors to turn off before definitively shutting down the vehicle.

Such operation of the management of the power supply of a vehicle poses a problem when new functions require power supply to certain processors to be maintained for longer. For example, monitoring the seal-tightness of the fuel tank requires operation to be maintained for about two hours, i.e. 4% of the charge of an automotive vehicle battery.

Use of the current architecture may create a drain on the battery, which drain may cause problems with starting and operating the vehicle.

There is therefore a need for a novel management of the power supply maintenance phase allowing the amount of power consumed to be reduced.

According to one aspect of the invention, a method is provided for controlling the electrical power supply of an automotive vehicle comprising a powertrain and an electrical power supply battery, the vehicle being equipped with at least one stand-alone processor, at least one master processor, and at least one slave processor, the processors being connected by a data network, the stand-alone processors each being able to perform at least one task after the powertrain has been turned off and power supply to the aforementioned processors has been maintained for a first length of time. The control method comprises the following steps in succession:

the absence of the stand-alone processor is declared to the master processor;
each slave processor has its power supply interrupted;
the master processor has its power supply interrupted;
the stand-alone processor has its power supply maintained beyond the first length of time; and
each stand-alone processor has its power supply interrupted when it has completed its task.

The control method has the advantage that only the one or more processors performing a monitoring operation without interacting with the other processors are left turned on. Power consumption is thus reduced, and it is not necessary to resort to oversizing the battery.

Another advantage of the control method is that it does not require the existing architecture of most vehicles to be modified.

The absence of the stand-alone processor may be declared by interrupting the transmission of data by the stand-alone processor to the master processor over the data network.

The absence of the stand-alone processor may be declared by transmitting a preset data packet from the stand-alone processor to the master processor over the data network.

According to another aspect of the invention, a system is provided for controlling the electrical power supply of an automotive vehicle comprising a powertrain and an electrical power supply battery, and equipped with at least one stand-alone processor, at least one master processor, and at least one slave processor, the processors being connected by a data network, the stand-alone processors each being able to perform at least one task after the powertrain has been turned off, the vehicle moreover being equipped with an electrical power supply network connecting the processors to the electrical power supply battery, characterized in that, each master processor and each stand-alone processor being able to manage their own connection to the electrical network, the processors are able to maintain their electrical power supply for a first length of time after the powertrain has been turned off, each stand-alone processor is able to perform a task after the powertrain has been turned off, each stand-alone processor furthermore being able to remain connected to the electrical network after the first length of time has expired, and to interrupt its own electrical connection after it has performed its task.

A stand-alone processor may be able to signal its absence to a master processor.

A stand-alone processor may be able to interrupt its transmission of data to a master processor over the data network, in order to declare its absence to the master processor.

A stand-alone processor may be able to transmit a preset data packet to a master processor over the data network, in order to declare its absence to the master processor.

The data network may be a CAN network. The expression "CAN network" is understood to mean a controller area network (CAN) that allows a large number of processors that communicate in turn to be connected to a given cable, or bus.

Figure 2:
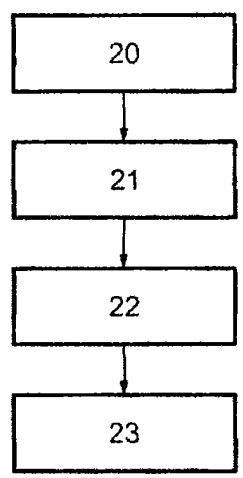

Other aims, features and advantages will become apparent on reading the following description given merely by way of nonlimiting example and with reference to the appended drawings, in which:

FIG. 1 illustrates the main elements of a data-exchange system of an automotive vehicle; and FIG. 2 illustrates the main steps of a power supply management method.

FIG. 1 illustrates a system for controlling the electrical power supply of an automotive vehicle after the powertrain has been turned off. The vehicle described below is a heat engine vehicle using a liquid or gaseous fuel. However, the control system also applies to an electric vehicle driven by an electric machine powered by batteries. A network for exchanging data between various processors may be seen. The network comprises a CAN type data bus referenced 1, connecting an engine management processor 2, a cockpit management processor 3, a first processor 4, and a second processor 5.

FIG. 1 illustrates an example comprising two processors that are separate from the engine management processor 2 and the cockpit management processor 3. However, other processors could be taken into account simply by extending the network illustrated in FIG. 1.

The CAN bus 1 is a two-way network able to exchange and transmit data with each of the processors that are connected to it via input connections (6, 8, 10, 12) and output connections (7, 9, 11, 13).

Moreover, each processor is connected to an electrical power supply network 14 by at least one connection (15, 16, 17, 18).

The term "processor" is understood to mean any active or passive means for defining, estimating or controlling.

The system for controlling power supply after the powertrain has been turned off is distributed between the cockpit management processor and the engine management processor.

The cockpit management processor manages functions relating to the cockpit, directly or via slave processors. The cockpit management processor is what is called the master processor because it controls network activity as long as it is supplied with power. It interrupts its power supply last. The processor controlling the electric windows or the air conditioning of the vehicle are examples of slave processors. When the vehicle is switched off, the cockpit management processor scans for the halt in activity of slave processors that have interrupted their power supply, then interrupts its own power supply.

The engine management processor is what is called a stand-alone processor because it controls its own electrical power supply without showing itself to be active on the CAN network, the master processor therefore believing it to be absent. It is independent of the cockpit management processor. The main function or task of the engine management processor is to control fuel injection. It also monitors the temperature of the cooling circuit and controls fans. After the powertrain has been turned off, the engine management processor may perform monitoring and maintaining tasks, for example monitoring the seal-tightness of the fuel tank. In the case of a hybrid vehicle, it may be a question of monitoring the seal-tightness of the hydrogen tank or of the fuel-cell stack. In an electric vehicle, it may be a question of monitoring the integrity or temperature of the batteries.

The engine management processor communicates with the cockpit management processor via the CAN bus. After the powertrain has been turned off and the ignition key has been removed, the engine management processor declares its absence to the cockpit management processor. Its absence may be declared by the transmission of a preset data packet (or frame). The absence may also be declared by interrupting the transmission of data over the network. The cockpit management processor no longer receiving data, concludes therefore that the engine management processor has completed its tasks or functions.

The cockpit management processor then monitors the activity of the slave processors to which it is connected, then interrupts its own power supply if the slaves have interrupted their data transmission.

On the contrary to the conclusion drawn by the cockpit management processor, the engine management processor is still supplied with power, and continues its tasks and functions. Once it has completed its tasks, the engine management processor interrupts its electrical power supply itself.

FIG. 2 illustrates the power supply stages through which the various processors pass. The method for controlling power supply management after powertrain turn-off is illustrated by the supply of power to the engine management processor being maintained in order for the seal-tightness of the tank to be monitored by the engine management processor. Such a task or function may be maintained for a long period of time because electrical power consumption is limited by supplying only those systems that are strictly necessary. This example may be applied to any other function carried out by one or more processors.

In a first step 20, power supply to the processors (2, 3, 4, 5) is maintained after shutdown of the vehicle.

In a second step 21, the engine management processor 2 ceases to transmit data over the CAN bus 1. It is then considered to be absent by the other processors (3, 4, 5).

In a third step 22, power supply to the other processors (4, 5) and to the cockpit management processor 3 is interrupted. After the third step 3, power supply to the engine management processor 2 is maintained whereas the cockpit management processor 3 and the other processors (4, 5) are powered down.

Electrical power consumption is thus reduced, whereas the engine management processor 2 may continue its monitoring and maintaining functions.

In a fourth step 23, the engine management processor 2 has completed its monitoring and maintaining functions and interrupts its own power supply. The vehicle is then completely shut down.

Thus, the cockpit management processor 3 controls the electrical power supply of other processors 4, 5, which are slaved to it. The cockpit management processor 3 is a stand-alone processor.

Moreover, the engine management processor 2 manages its power supply and its operation autonomously from the cockpit management processor 3. The engine management processor 2 is a stand-alone processor.

In other words, the method for controlling a vehicle comprising a stand-alone processor, a master processor and slave processors allows the electrical power supply to the stand-alone processor to be maintained via declaration of its absence to the master processor. This absence may be declared actively by sending a particular data packet, or passively by interrupting communication with the master processor. The master processor then interrupts its own power supply once power supply to the slave processors has been interrupted.

The stand-alone processor is then still supplied with power and may continue its functions, for example monitoring and maintaining functions.

When the stand-alone processor has completed its functions, it interrupts its own power supply. The vehicle is then shut down.

The control method and system allow the vehicle to be supervised before it is completely shut down once, all inter-processor exchanges have taken place.

The advantage of the control method and system lies in the fact that focus is placed on the transition from a request for power supply to a processor to be maintained based on its useful communication with other processors, to a request for power supply to be maintained to a processor no longer needing to interact with other processors.

The control system and method thus detect the stand-alone state of a processor and consequently adjust power supply to the various processors.

The invention claimed is:

1. A method for controlling electrical power supply of an automotive vehicle including a powertrain, an electrical power supply battery, a stand-alone processor, a master processor, and at least one slave processor, the processors being connected to a data network, the stand-alone processor being configured to perform at least one task after the powertrain has been turned off and power supply to the processors has been maintained for a first length of time from the turn off of the powertrain, the control method comprising, in succession:
declaring absence of the stand-alone processor to the master processor;
interrupting the power supply to each of the at least one slave processors;
interrupting the power supply to the master processor;
maintaining the power supply to the stand-alone processor beyond the first length of time from the turn off of the powertrain; and
interrupting the power supply to the stand-alone processor, by the stand-alone processor, when the stand-alone processor has completed the at least one task.

2. The method as claimed in claim 1, wherein the absence of the stand-alone processor is declared by interrupting the transmission of data by the stand-alone processor to the master processor over the data network.

3. The method as claimed in claim 1, wherein the absence of the stand-alone processor is declared by transmitting a preset data packet from the stand-alone processor to the master processor over the data network.

4. The method as claimed in claim 1, wherein the stand-alone processor is an engine management processor.

5. The method as claimed in claim 1, wherein the powertrain being turned off includes turning off the engine and removing an ignition key from the ignition.

6. A system for controlling electrical power supply of an automotive vehicle including a powertrain and an electrical power supply battery, the system comprising:
a stand-alone processor;
a master processor; and
at least one slave processor,
the processors being connected to a data network, the stand-alone processor being configured to perform at least one task after the powertrain has been turned off, the automotive vehicle further including an electrical power supply network connecting the processors to the electrical power supply battery, wherein,
each of the master processor and the stand-alone processor is configured to manage their own connection to the electrical power supply network,
the processors are configured to maintain their electrical power supply for a first length of time after the powertrain has been turned off,
the stand-alone processor is configured to perform a task after the powertrain has been turned off, and
the stand-alone processor is further configured to remain connected to the electrical power supply network after the first length of time has expired, and to interrupt its own connection to the electrical power supply network after it has performed the at least one task.

7. The control system as claimed in claim 6, wherein the stand-alone processor is configured to signal its absence to the master processor.

8. The system as claimed in claim 7, wherein the stand-alone processor is configured to interrupt its transmission of data to the master processor over the data network, to declare its absence to the master processor.

9. The system as claimed in claim 7, wherein the stand-alone processor is configured to transmit a preset data packet to the master processor over the data network, to declare its absence to the master processor.

10. The system according to claim 6, wherein the data network is a CAN network.

11. The control system as claimed in claim 6, wherein the stand-alone processor is an engine management processor.

12. The control system as claimed in claim 6, wherein the powertrain being turned off includes turning off the engine and removing an ignition key from the ignition.

* * * * *